United States Patent
Kaup

Patent No.: US 6,636,637 B1
Date of Patent: Oct. 21, 2003

(54) METHOD AND ARRANGEMENT FOR CODING AND DECODING A DIGITIZED IMAGE

(75) Inventor: Andre Kaup, Höhenkirchen (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/308,731
(22) PCT Filed: Jan. 7, 1998
(86) PCT No.: PCT/DE98/00026
§ 371 (c)(1),
(2), (4) Date: May 24, 1999
(87) PCT Pub. No.: WO98/34406
PCT Pub. Date: Aug. 6, 1998

(30) Foreign Application Priority Data

Jan. 31, 1997 (DE) .......................... 197 03 672

(51) Int. Cl.[7] ............................. G06K 9/36; G06K 9/46; H04B 1/66
(52) U.S. Cl. .................... 382/232; 382/243; 382/233; 382/236; 382/239; 382/248; 382/25; 382/251; 375/240.02; 375/240.03; 375/240.08; 375/240.13; 375/240.18
(58) Field of Search ................. 382/232–236, 382/238, 239, 243, 248, 250–251, 166, 253, 242, 276, 277, 282; 375/240.02, 240.03, 240.08, 240.12, 240.13, 240.18, 240.2, 240.25, 240.01, 240.1, 240.24

(56) References Cited

U.S. PATENT DOCUMENTS

| | | | | |
|---|---|---|---|---|
| 5,748,789 A | * | 5/1998 | Lee et al. ................. | 382/243 |
| 5,802,213 A | * | 9/1998 | Gardos .................... | 382/239 |
| 5,946,419 A | * | 8/1999 | Chen et al. ............... | 382/243 |
| 5,978,514 A | * | 11/1999 | Yamaguchi et al. ........ | 382/243 |
| 6,049,629 A | * | 4/2000 | Hirabayashi .............. | 382/239 |
| 6,222,881 B1 | * | 4/2001 | Walker .................... | 375/240.03 |
| 6,324,301 B1 | * | 11/2001 | Jacquin et al. ............ | 382/166 |

OTHER PUBLICATIONS

Kaup, Andre et al, On the Performance of the Shape Adaptive DCT in Object–Based Coding of Motion Compensated Difference Images, Siemens Corp. Tech., Networks and Communications, No. 143, (1997), pp. 653–657.

Sikora, Thomas, "Low complexity shape–adaptive DCT for coding of arbitrarily shaped image segments", Signal Processing Image Communication, vol. 7, No. 4/6, (1995), pp. 381–395.

ISO/IEC JTC1/SC29/WG11, MPEG-4 Video Verification Model Version 5.0 Doc. N1469, Nov. (1996), pp. 55–59.

Sikora, Thomas et al, Shape Adaptive DCT for Generic Coding of Video, IEEE Transactions on Circuits and Systems for Video Technology, vol. 5, No. 1, Feb. (1995), pp. 59–62.

Jain, Anil K., Image Data Compression: A Review, Proceedings of the IEE, vol. 69, No. 3, Mar. 1981, pp. 349–389.

* cited by examiner

Primary Examiner—Andrew W. Johns
Assistant Examiner—Amir Alavi
(74) Attorney, Agent, or Firm—Schiff Hardin & Waite

(57) ABSTRACT

The method and apparatus have a shape-adapted transformation coding is in which in the intra-image coding and the inter-image coding different shape-adapted transformation codings are carried out. A first shape-adapted transformation coding takes place in the intra-image coding, and a second shape-adapted transformation coding, different from the first shape-adapted image coding, takes place in the inter-image coding.

20 Claims, 3 Drawing Sheets

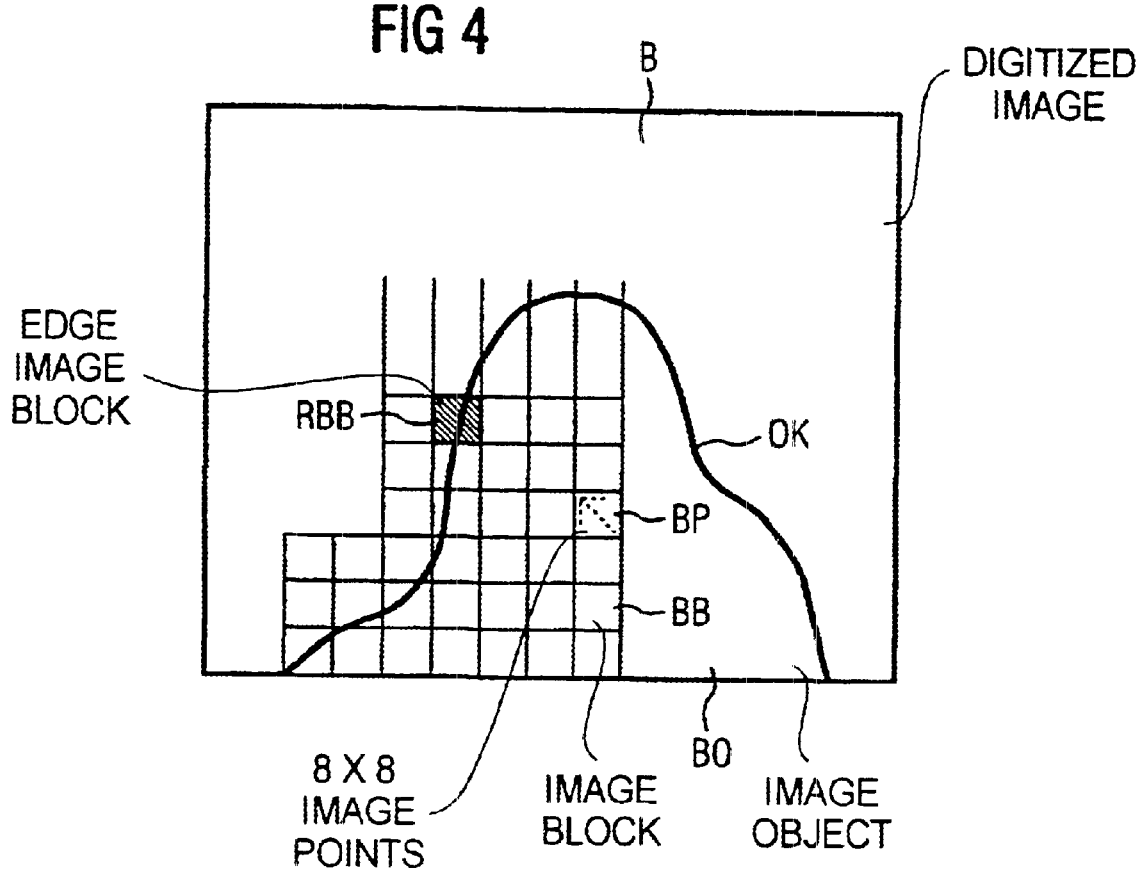

METHOD AND ARRANGEMENT FOR CODING AND DECODING A DIGITIZED IMAGE

BACKGROUND OF THE INVENTION

The coding of video signals corresponding to the image coding standards H.261, H.263, MPEG1 and MPEG2 is based on a block-oriented discrete cosine transformation (DCT). In general, these methods use the principle of block-based image coding.

Another approach to image coding is what is called the principle of object-based image coding. In object-based image coding, a segmenting of the image documents takes place corresponding to the objects present in the scene, and a separate coding of these objects takes place.

FIG. 2 shows a general representation of an arrangement for image coding and image decoding.

FIG. 2 shows a camera K with which images are exposed. The camera K can for example be an arbitrary analog camera K that records images of a scene and either digitizes the images in the camera K or also transmits them in analog fashion to a first computer R1, in which then either the digitized images B are processed or the analog images are converted into digitized images B and the digitized images B are processed.

The camera K can also be a digital camera K with which digitized images B are recorded directly and are supplied to the first computer R1 for further processing.

The first computer R1 can also be fashioned as a separate arrangement with which the method steps specified below can be executed, for example as a separate computer card that is installed in a computer.

The first computer R1 comprises a processor unit P with which the method steps, specified below, of the image coding or of the image decoding can be executed. The processor unit P is coupled, for example via a bus BU, with a memory SP in which the image data are stored.

In general, the methods specified below can be realized both in software and in hardware, or also partly in software and partly in hardware.

After the image coding has taken place in the first computer R1, and after transmission of the compressed image data, via a transmission medium UW, to a second computer R2, the image decoding is carried out in the second computer R2.

The second computer R2 can have the same design as the first computer R1, i.e. the memory SP that is coupled with the processor unit P via the bus BU.

In FIG. 3, a possible arrangement, in the form of a schematic switching diagram for image coding or, respectively, for image decoding, is shown in detailed form, which arrangement can be used in the context of the block-based image coding and partly, as explained below, in the context of the object-based image coding.

In block-based image coding methods, a digitized image B is partitioned into, standardly, square blocks of size 8×8 image points BP or 16×16 image points BP, and is supplied to the arrangement for image coding.

Coding information, e.g. brightness information (luminance values) or color information (chrominance values), is standardly allocated unambiguously to an image point.

In block-based image coding methods, distinctions are made between different image coding modes.

In what is called intra-image coding mode, the overall image is respectively coded with the overall coding information allocated to the image points of the image and is transmitted (I-image).

In what is called inter-image coding mode, only the difference image information of two chronologically successive images is coded and transmitted (P-image, B-image).

Two switching units SE are provided for the changeover between the intra-image coding mode and the inter-image coding mode. For the execution of the inter-image coding mode, a subtraction unit S is provided in which the difference of the image information of two successive images B is formed. The overall image coding is controlled via an image coding control unit ST. The image blocks BB or, respectively, difference image blocks BB to be coded are respectively supplied to a transformation coding unit DCT, in which a transformation coding, for example discrete cosine transformation (DCT), is applied to the coding information allocated to the image points.

In general, however, any transformation coding, e.g. a discrete sine transformation or also a discrete Fourier transformation, can be executed.

The spectral coefficients formed by the transformation coding are quantized in a quantization unit Q and are supplied to an image coding multiplexer (not shown), e.g. for channel coding and/or for entropy coding. In an internal reconstruction loop, the quantized spectral coefficients are inversely quantized in an inverse quantization unit IQ and are subjected to an inverse transformation coding in an inverse transformation coding unit IDCT.

In addition, in the case of inter-image coding, image information of the respective chronologically preceding image is added in an addition unit AE. The images reconstructed in this way are stored in an image memory SP. For simplicity of representation, in the image memory SP a unit for motion compensation MC is shown symbolically.

In addition, a loop filter (LF) is provided that is connected with the memory SP and with the subtraction unit S.

In addition to the image data to be transmitted, a mode flag p is supplied to the image coding multiplexer, which flag indicates whether an intra- or an inter-image coding was executed.

In addition, quantization indices q for the spectral coefficients are supplied to the image coding multiplexer.

A motion vector v is also respectively allocated to an image block and/or to a macro block that contains e.g. 4 image blocks, and is supplied to the image coding multiplexer.

In addition, an information indication f for the activation or, respectively, deactivation of the loop filter LF is provided.

After transmission of the image information via the transmission medium ÜM, the decoding of the transmitted data can take place in the second computer R2. For this purpose, in the second computer R2 an image decoding unit is provided that has for example the design of the reconstruction loop of the arrangement shown in FIG. 2.

In object-based image coding methods, each image object is first decomposed into blocks of a fixed size, e.g. likewise 8×8 image points. After this decomposition, a part of the resulting image blocks is located completely inside an image object BO. This situation is shown in FIG. 4. The image B contains at least one image object BO that is outlined with an object edge OK of the image object BO. In addition, image blocks BB with 8×8 image points BP are shown. Image blocks BB that contain at least a part of the object edge OK are called edge image blocks RBB in the following.

Image blocks BB that are located completely inside the image object BO after the decomposition can be coded with a standard block-based discrete cosine transformation, using the above-named block-based image coding method. However, the edge image blocks RBB are partly filled with image information, and must be coded using a separate method.

For the coding of the edge image blocks RBB, up to now there have been two basic approaches.

From a first document, ISO/IEC JTC1/SC29/WG11, MPEG4 Video Verification Model-Version 5.0, Doc. N1469, November 1996, pp. 55–59, it is known to supplement the image information of the image object BO within the edge image block RBB by means of a suitable extrapolation method of the coding information onto the surface of the complete edge image block RBB. This procedure is called padding. The supplemented surface is subsequently coded with a standard 2-dimensional discrete cosine transformation.

Alternatively the first document and a second document, T. Sikora and B. Makai, Shape Adaptive DCT for Generic Coding of Video, IEEE Transactions on Circuits and Systems for Video Technology, Vol. 5, pp. 59–62, February 1995, it is known that the given image object BO is transformed separately according to lines and columns. This procedure is called shape-adapted transformation coding; in the concrete case of the application of a DCT, it is called shape-adapted DCT. The DCT coefficients allocated to the image object BO are determined in such a way that the image points BP of an edge image block RBB that do not belong to the image object BO are screened out. A transformation is then applied, line-by-line at first, to the remaining image points BP, whose length corresponds to the number of remaining image points in this line. The resulting coefficients are oriented horizontally and are subsequently subjected to a further one-dimensional DCT in the vertical direction, with corresponding length. The same method is hereby used both for the intra-image coding and for the inter-image coding.

The known method of shape-adaptive transformation coding specified above has, above all, the disadvantage that only a relatively poor compression factor of the image data to be compressed is achieved.

The known rule for coding prediction error images in shape-adapted transformation coding is based on a transformation matrix DCT–N with the following construction:

$$DCT-N(p, k_O) = \gamma \cdot \cos(p \cdot (k+\frac{1}{2}) \cdot \Pi/N) k, p=0 \rightarrow N- \quad (1).$$

The value is hereby $\gamma=1/\sqrt{2}$ for the case p=0, and is $\gamma=1$ for all other cases.

N designates a size of the image vector to be transformed within which the transformed image points are contained.

DCT–N designates a transformation matrix of size N×N. With p, k, indices are designated with p, k $\in$(0, N–1).

According to the known procedure, the shape-adapted PCT of an image segment is determined in that first each column of the segment is vertically transformed according to the rule $$c_j = 2 \cdot (2/N) \cdot DCT-N \cdot xj \quad (2)$$

and subsequently the same rule (2) is applied to the resulting data in the horizontal direction. The rule according to equation (2) is however not optimal for the coding of prediction error images.

From a third document, A. K. Jain, Image Data Compression: A Review, Proceedings of the IEEE, Vol. 69, No.3, pp. 349–389, March 1981, foundations of block-based image coding are known.

SUMMARY OF THE INVENTION

The invention is thus based on the problem of indicating methods for image coding and for image decoding and arrangements for image coding and for image decoding with which a shape-adapted transformation coding is achieved with an improved compression factor for the image data.

In the method according to present invention for the coding of a digitized image, the image coding takes place in an intra-image coding mode or in an inter-image coding mode. In the intra-image coding mode, the image information of the image points is transformed, and in the inter-image coding mode, difference image information of image information of two successive images is transformed. In the inter-image coding mode, a first shape-adapted transformation coding is carried out, and in the intra-image coding mode a second shape-adapted transformation coding, different from the first shape-adapted transformation coding, is carried out.

A particular advantage of this procedure is that the use of two different transformation codings makes it possible to distribute uniformly over all image points Bp the quantization error in the subsequent quantization of the spectral coefficients resulting from the transformation, and the quantization error has the same mean value as in the case of a normal 8×8 image block.

This method is suitable above all for the coding of edge image blocks of an image segment.

Overall, the method enables a significantly improved coding efficiency, i.e., at the same data rate the image quality that can be achieved increases. As specified below, in contrast to the known procedure, the use of the same transformation in intra-image coding and in inter-image coding given a shape-adapted image coding, a considerably improved signal/noise ratio of approximately one dB can be achieved without additional computing expense.

In the method according to a further embodiment, in the decoding in the intra-image coding mode a first inverse shape-adapted transformation coding is carried out. In the intra-image coding mode, a second inverse shape-adapted transformation coding is carried out. The first inverse shape-adapted transformation coding and the second inverse shape-adapted transformation coding are different.

This method likewise comprises the advantages shown correspondingly above for the image coding.

In the arrangement according to present invention for the execution of the method, a transformation coding unit is provided for the shape-adapted transformation coding of the image points and/or a transformation decoding unit is provided for the inverse shape-adapted transformation coding. The transformation coding unit or, respectively, the transformation decoding unit is constructed in such a way that in the intra-image coding mode a first shape-adapted transformation coding or, respectively, a first inverse shape-adapted transformation coding is carried out. In the inter-image coding mode, a second shape-adapted transformation coding or, respectively, a second inverse shape-adapted transformation coding is carried out. The first shape-adapted transformation coding or, respectively, the first inverse shape-adapted transformation coding and the second shape-adapted transformation coding or, respectively, the second inverse shape-adapted transformation coding are different.

The advantages specified above also hold for the arrangement.

In a development of the invention, it is advantageous that at least one of the shape-adapted transformation codings or, respectively, at least one of the inverse shape-adapted transformation codings take place in such a way that the signal energy of the image points to be transformed in the spatial domain is approximately equal to the signal energy of the transformed image points in the frequency domain.

In other words, this means that the corresponding shape-adapted transformation coding or, respectively, inverse shape-adapted transformation coding is orthonormalized. A particular advantage of this procedure is that the quantization error in the subsequent quantization of the spectral coefficients resulting due to the transformation is distributed uniformly over all image points, and the quantization error has the same mean value as in the case of a normal 8×8 image block.

In a development of the method for image coding, it is in addition advantageous to form the transformation coefficients $c_j$ of the image points $x_j$ to be transformed according to the following rule:

$$c_j = (\sqrt{(2/N)}) \cdot DCT\text{-}N(p,k) \cdot x_j \quad (3),$$

whereby

N designates a size of the image vector to be transformed in which the transformed image points are contained, DCT–N designates a transformation matrix of size N×N, p, k designate indices, with p, k $\epsilon(0, N-1)$.

As can be seen in the rule (3), the considerable improvement is achieved solely by means of a scaling of the transformation rule that is different from the known procedure.

The above-specified developments for the method for image coding are likewise provided as developments for image decoding, with the rule for inverse transformation coding with the correspondingly inverse rule.

The developments of the method are likewise advantageous for constructions of the transformation coding unit of the arrangement for image coding.

These methods are suited above all for the coding or, respectively, decoding of edge image blocks of an image segment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals, identify like elements, and in which:

FIG. 4 symbolically shows a representation of an image with an image object and image blocks and edge image blocks.

DESCRIPTION OF THE PREFERRED EMBODIMENTS

In the context of the object-based image coding, there takes place a segmentation of the digitized image B corresponding to the image objects BO occurring in the scene, and a separate coding of the image objects BO.

For this purpose, each image object BO is first standardly decomposed into image blocks BB of a fixed size, e.g. 8×8 image points BP. After the decomposition, a portion of the resulting image blocks BB are located entirely inside the image object BO. These blocks BB can be coded with a standard block-based transformation coding, using the cited methods explained above.

As specified above, the edge image blocks RBB are however only partly filled with items of image information, and must be coded with a separate method.

Figure 1:
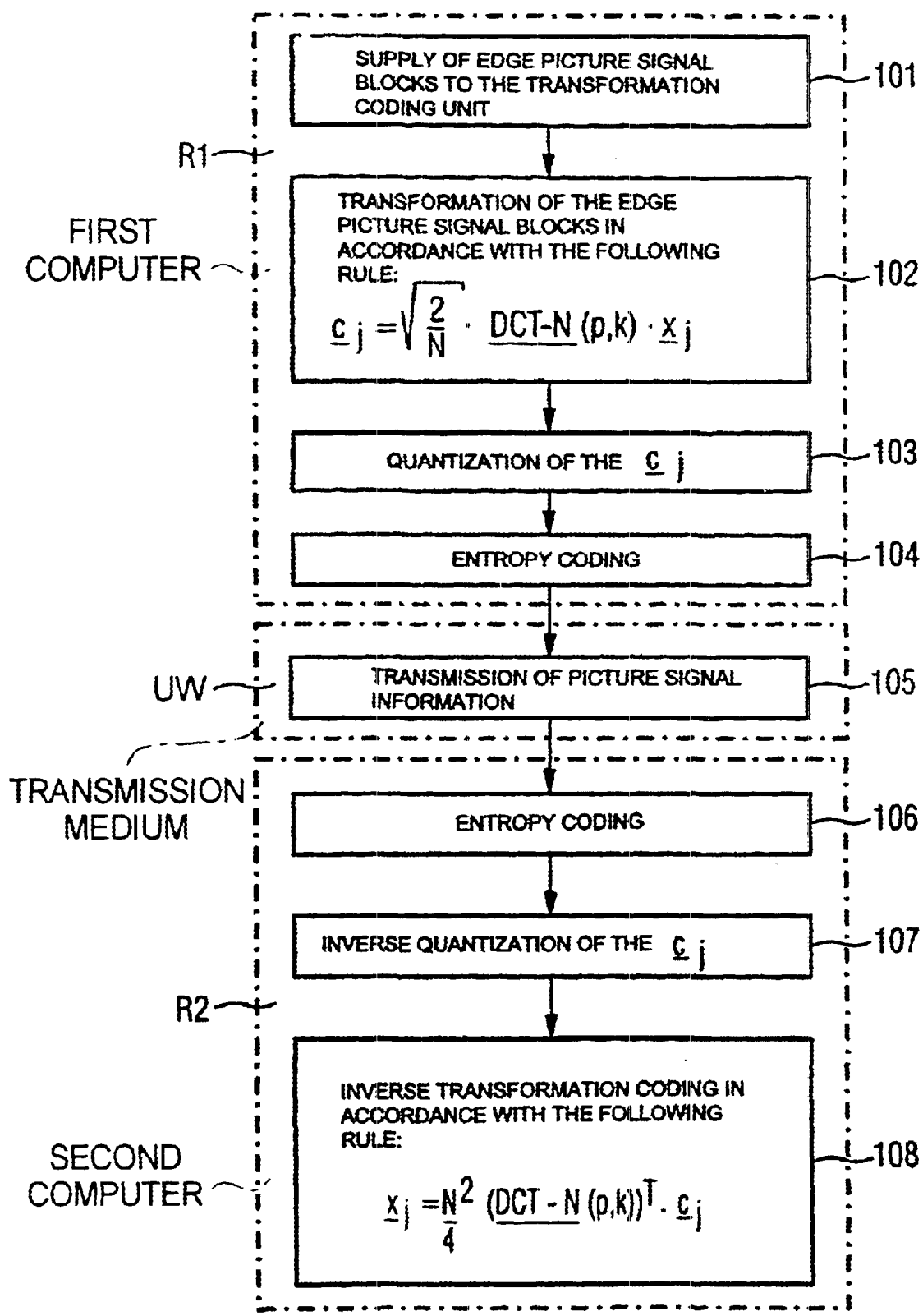
FIG. 1 shows a flow diagram in which the individual method steps are shown symbolically.
Figure 2:
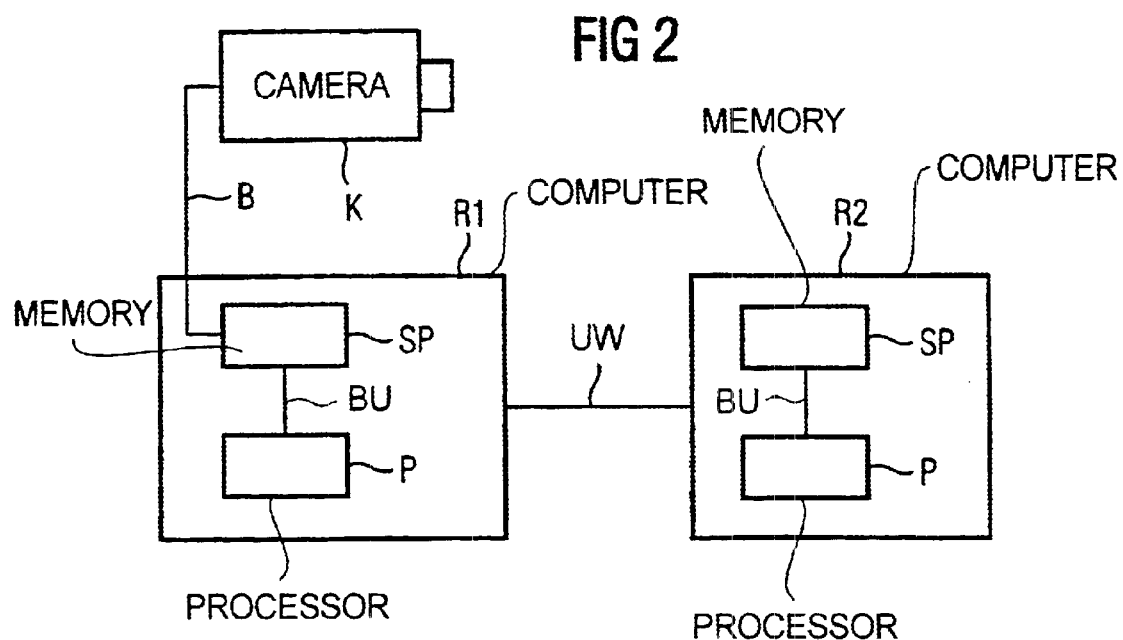
FIG. 2 shows a standard arrangement for image coding, with a camera, two computers and a transmission medium.
Figure 3:
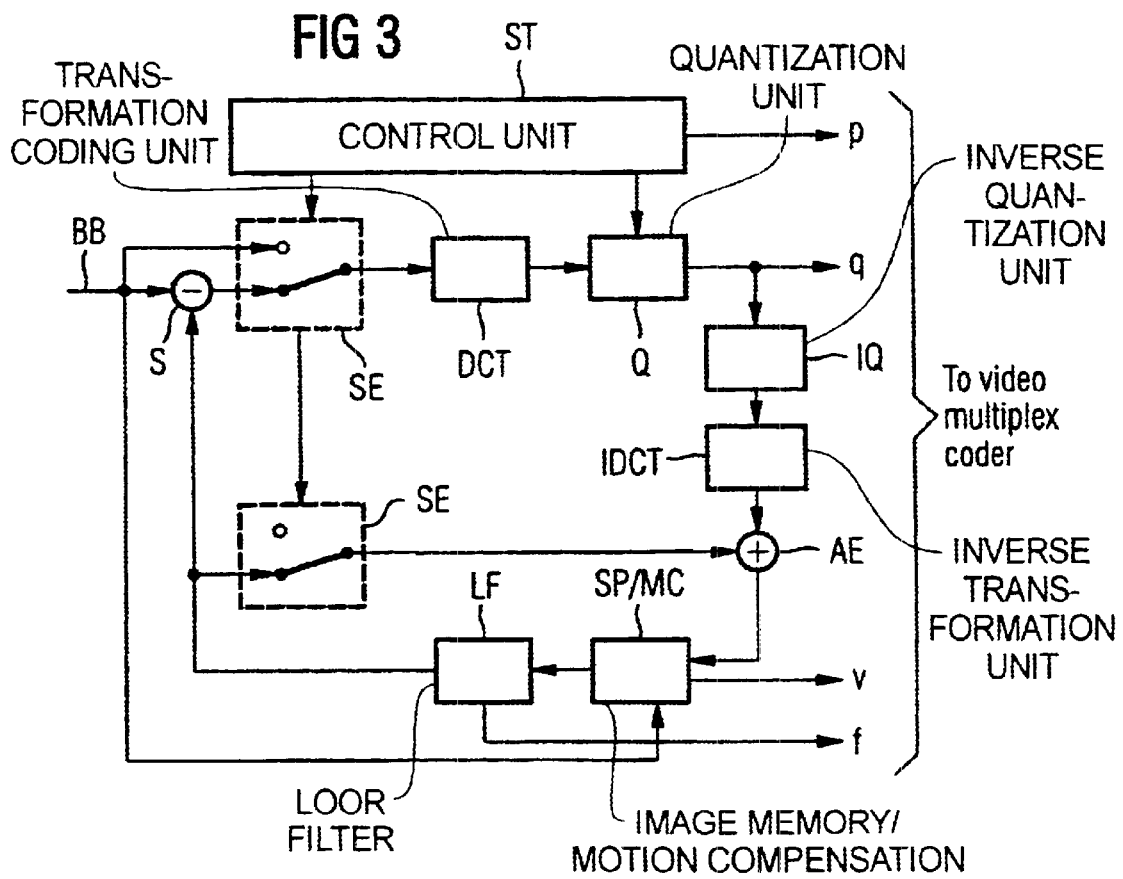
FIG. 3 shows a drawing of a standard arrangement for block-based image coding.

In the method, in the first computer R1 edge image blocks RBB are preferably supplied to the transformation coding unit DCT in a first step 101. The first computer R1 is constructed in such a way that the modules shown symbolically in FIG. 3 can be executed.

In a second step 102, for each edge image block RBB, for the coding information of the image points BP of the respective edge image block RBB transformation coefficients $c_j$ of the image points $x_j$ to be transformed are formed according to the following rule:

$$c_j = (\sqrt{(2/N)}) \cdot DCT\text{-}N(p,k) \cdot x_j \quad (3),$$

whereby

N designates a size of the image vector to be transformed in which the transformed image points are contained, DCT–N designates a transformation matrix of size N×N, p, k designate indices, with p, k $\epsilon(0, N-1)$.

As can be seen, the rule for transformation coding (3) means that the signal energy of the coding information of the image points to be transformed in the spatial domain is equal to the signal energy of the coding information of the transformed image points in the frequency domain.

As a shape-adapted transformation coding, shape-adapted discrete cosine transformation is preferably used.

Rule (3) is preferably applied for transformation coding when the image coding takes place in the inter-image coding mode.

If the image coding takes place in the intra-image coding mode, the transformation coefficients $c_j$ of the transformed image points $x_j$ are preferably formed according to the following rule:

$$c_j = 2 \cdot (2/N) \cdot DCT\text{-}N \cdot x_j \quad (2),$$

After transmission of the coded image information (step 105) via the transmission medium UW, i.e. after quantization (step 103), possible entropy coding (step 104) of thee transmitted image data, e.g. according to the method specified in the first above identified document, an image decoding is carried out in the second computer R2.

In the image decoding, in a first step 106 an entropy decoding is carried out, and in a second step 107 an inverse quantization of the quantized spectral coefficients is carried out. The spectral coefficients cj are in addition supplied to the inverse shape-adapted transformation coding (IDCT). Corresponding to the method for image coding, for the image decoding a shape-adapted transformation coding is in turn carried out in such a way that the signal energy of the coding information of the transformed image points in the frequency domain is approximately equal to the signal energy of the coding information of the image points in the spatial domain.

For the inverse shape-adapted transformation coding, the image points $x_j$ are formed from the spectral transformation coefficients $c_j$ according to the following rule (step 108):

$$x_j = (\sqrt{(2/N)}) \cdot (DCT\text{-}N(p,k))^{-1} \cdot cj \quad (4),$$

whereby
- N designates a size of the image vector to be transformed in which the transformed image points are contained,
- DCT–N designates a transformation matrix of size N×N,
- p, k designate indices, with p, k $\epsilon(0, N-1)$,
- ( )⁻ designates an inversion of a matrix.

The inverse shape-adapted transformation coding according to rule (4) is preferably carried out in the context of the image decoding in the inter-image decoding mode.

In the intra-image decoding mode, the shape-adapted inverse transformation coding is preferably carried out according to the following rule:

$$x_j = (\tfrac{1}{2}) \cdot (DCT\text{-}N(p,k))^{-1} \cdot cj \quad (5).$$

In the arrangement for image coding, a transformation coding unit DCT is provided for the shape-adapted transformation coding of the image points BP. The transformation coding unit DCT is constructed in such a way that a signal energy of the coding information of the image points to be transformed in the spatial domain is approximately equal to the signal energy of the coding information of the transformed image points in the frequency domain.

The transformation coding unit is preferably constructed in such a way that the method steps shown in the context of the method for image coding are realized in the transformation coding unit DCT. In the arrangement, the method can of course also be realized in software that is processed by the processor P.

The same holds for the arrangement for image decoding, which comprises an inverse transformation coding unit IDCT. Correspondingly, the inverse transformation coding unit IDCT is constructed in such a way that the method steps for the image decoding, in particular for the inverse shape-adapted transformation coding, is realized.

Both the method and the arrangements can preferably be applied to edge image blocks RBB of image objects BO of a digitized image B.

As can be seen, the method means that different shape-adapted transformation codings are carried out in the intra-image coding and in the inter-image coding. A first shape-adapted transformation coding takes place in the intra-image coding, and a second shape-adapted transformation coding, different from the first shape-adapted transformation coding, takes place in the inter-image coding.

The manner in which the transformed image points, i.e. the spectral coefficients, are further used in the context of the image coding, i.e., the type of quantization, the entropy coding, or, respectively, the channel coding, are not essential for the invention.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for coding a digitized image that have image objects with a number of image points, comprising the steps of:
   - performing image coding in one of an intra-image coding mode or in an inter-image coding mode;
   - transforming in the intra-image coding mode the image information of the image points;
   - transforming in the inter-image coding mode difference image information of image information of two successive images;
   - carrying out in the inter-image coding mode a first shape-adapted transformation coding; and
   - carrying out in the intra-image coding mode a second shape-adapted transformation coding, different from the first shape-adapted transformation coding.

2. The method according to claim 1,
   - wherein a variant of a shape-adapted discrete cosine transformation is used as a first shape-adapted transformation coding, and
   - wherein a shape-adapted discrete cosine transformation is used as a second shape-adapted transformation coding.

3. The method according to claim 1, wherein at least one of the first shape-adapted transformation coding and the second shape-adapted transformation coding takes place such that a signal energy of the image points to be transformed in a spatial domain is approximately equal to a signal energy of the transformed image points in the frequency domain.

4. A method for coding a digitized image that have image objects with a number of image points, comprising the steps of:
   - performing image coding in one of an intra-image coding mode or in an inter-image coding mode;
   - transforming in the intra-image coding mode the image information of the image points;
   - transforming in the inter-image coding mode difference image information of image information of two successive images;
   - carrying out in the inter-image coding mode a first shape-adapted transformation coding; and
   - carrying out in the intra-image coding mode a second shape-adapted transformation coding, different from the first shape-adapted transformation coding;
   - wherein transformation coefficients $c_j$ of the image points $x_j$ transformed according to the first shape-adapted transformation coding are formed according to the following rule:

$$c_j = (\sqrt{(2/N)}) DCT\text{-}N(p,k) \cdot x_j,$$

whereby
   - N designates a size of an image vector to be transformed in which the transformed image points are contained,
   - DCT–N designates a transformation matrix of size N×N,
   - p, k designate indices, with p, k $\epsilon(0, N-1)$.

5. The method according to claim 1, wherein the first shape-adapted transformation coding is applied only to edge image blocks.

6. A method for decoding a digitized image that have image objects with a number of image points, comprising the steps of:
   - performing the image decoding in at least one of an intra-image decoding mode or in an inter-image decoding mode;
   - transforming in the intra-image decoding mode the image information of the image points;
   - transforming in the inter-image decoding mode difference image information of image information of two successive images;
   - carrying out in the inter-image decoding mode a first inverse shape-adapted transformation coding; and carrying out in the intra-image decoding mode a second inverse shape-adapted transformation coding, different from the first inverse shape-adapted transformation coding.

7. The method according to claim 6,
wherein a variant of a shape-adapted inverse discrete cosine transformation is used as a first inverse shape-adapted transformation coding, and
wherein an inverse shape-adapted discrete cosine transformation is used as a second inverse shape-adapted transformation coding.

8. The method according to claim 6, wherein at least one of the first inverse shape-adapted transformation coding and the second inverse shape-adapted transformation coding takes place such that a signal energy of the image points to be transformed in a spatial domain is approximately equal to a signal energy of the transformed image points in the frequency domain.

9. A method for decoding a digitized image that have image objects with a number of image points, comprising the steps of:
performing the image decoding in at least one of an intra-image decoding mode or in an inter-image decoding mode;
transforming in the intra-image decoding mode the image information of the image points;
transforming in the inter-image decoding mode difference image information of image information of two successive images;
carrying out in the inter-image decoding mode a first inverse shape-adapted transformation coding; and
carrying out in the intra-image decoding mode a second inverse shape-adapted transformation coding, different from the first inverse shape-adapted transformation coding;
wherein, in the first inverse shape-adapted transformation coding, transformed image points $x_j$ are formed from transformation coefficients $c_j$ according to the following rule:

$$x_j = (\sqrt{(2/N)})(DCT\text{-}N(p,k))^{-1} \cdot c_j,$$

whereby
N designates a size of the image vector to be transformed in which the transformed image points are contained,
DCT–N designates a transformation matrix of size N×N,
p, k designate indices, with p, k $\in (0, N-1)$,
( )⁻ designates an inversion of a matrix.

10. The method according to claim 6, wherein the first inverse shape-adapted transformation coding is applied only to edge image blocks.

11. An arrangement for coding a digitized image having image objects with a number of image points, comprising:
device for receiving image point of the digitized image; and
a processor unit connected to said device and structured such that
the image coding takes place in one of an intra-image coding mode or in an inter-image coding mode,
in the intra-image coding mode the image information of the image points is transformed,
in the inter-image coding mode difference image information of image information of two successive images is transformed,
in the inter-image coding mode a first shape-adapted transformation coding is carried out, and
in the intra-image coding mode a second shape-adapted transformation coding, different from the first shape-adapted transformation coding, is carried out.

12. The arrangement according to claim 11, wherein the processor unit is structured such that a variant of a shape-adapted discrete cosine transformation is used as a first shape-adapted transformation coding, and a shape-adapted discrete cosine transformation is used as a second shape-adapted transformation coding.

13. The arrangement according to claim 11, wherein the processor unit is structured such that at least one of the first shape-adapted transformation coding and the second shape-adapted transformation coding takes place such that a signal energy of the image points to be transformed in a spatial domain is approximately equal to a signal energy of transformed image points in a frequency domain.

14. A arrangement for coding a digitized image having image objects with a number of image points, comprising:
device for receiving image point of the digitized image; and
a processor unit connected to said device and structured such that
the image coding takes place in one of an intra-image coding mode or in an inter-image coding mode,
in the intra-image coding mode the image information of the image points is transformed,
in the inter-image coding mode difference image information of image information of two successive images is transformed,
in the inter-image coding mode a first shape-adapted transformation coding is carried out, and
in the intra-image coding mode a second shape-adapted transformation coding, different from the first shape-adapted transformation coding, is carried out;
wherein the processor unit is set up such that transformation coefficients $c_j$ of the image points $x_j$ transformed according to the first shape-adapted transformation coding are formed according to the following rule:

$$c_j = (\sqrt{(2/N)})DCT\text{-}N(p,k) \cdot x_j,$$

whereby
N designates a size of an image vector to be transformed in which the transformed image points are contained,
DCT–N designates a transformation matrix of size N×N,
p, k designate indices, with p, k $\in (0, N-1)$.

15. The arrangement according to claim 11, wherein the processor unit is structured such that the first shape-adapted transformation coding is applied only to edge image blocks.

16. An arrangement for decoding a digitized image having image objects having an arbitrary number of image points, comprising:
device for receiving image points of the digitized image; and
a processor unit connected to the device and structured such that
the image decoding takes place in one of an intra-image decoding mode or in an inter-image decoding mode,
in the intra-image decoding mode the image information of the image points is transformed,
in the inter-image decoding mode difference image information of image information of two successive images is transformed, in the inter-image decoding mode a first inverse shape-adapted transformation coding is carried out, and in the intra-image decoding mode a second inverse shape-adapted transformation coding, different from the first inverse shape-adapted transformation coding, is carried out.

17. The arrangement according to claim 16, wherein the processor unit is such that a variant of a shape-adapted inverse discrete cosine transformation is used as a first inverse shape-adapted transformation coding, and an inverse shape-adapted discrete cosine transformation is used as second inverse shape-adapted transformation coding.

18. The arrangement according to claim 16, the processor unit is structured such that at least one of the first inverse shape-adapted transformation coding and the second inverse shape-adapted transformation coding takes place such that a signal energy of the image points to be transformed in a spatial domain is approximately equal to a signal energy of transformed image points in a frequency domain.

19. A arrangement for decoding a digitized image having image objects having an arbitrary number of image points, comprising:

device for receiving image points of the digitized image; and a processor unit connected to the device and structured such that the image decoding takes place in one of an intra-image decoding mode or in an inter-image decoding mode, in the intra-image decoding mode the image information of the image points is transformed, in the inter-image decoding mode difference image information of image information of two successive images is transformed, in the inter-image decoding mode a first inverse shape-adapted transformation coding is carried out, and in the intra-image decoding mode a second inverse shape-adapted transformation coding, different from the first inverse shape-adapted transformation coding, is carried out;

wherein the processor unit is structured such that image points $x_j$ transformed in the first inverse shape-adapted transformation coding are formed from transformation coefficients $c_j$ according to the following rule:

$$x_j = (\sqrt{(2/N)})(DCT\text{-}N(p,k))^{-1} \cdot c_j,$$

whereby

N designates a size of the image vector to be transformed in which the transformed image points are contained, DCT–N designates a transformation matrix of size N×N, p, k designate indices, with p, k $\epsilon$(0, N−1), ( )⁻ designates an inversion of a matrix.

20. The arrangement according to claim 16, wherein the processor unit is structured such that the first inverse shape-adapted transformation coding is applied only to edge image blocks.

* * * * *